United States Patent
Althaus et al.

(10) Patent No.: US 7,594,765 B2
(45) Date of Patent: Sep. 29, 2009

(54) ARRANGEMENT FOR OPTICALLY COUPLING AN OPTICAL WAVEGUIDE TO AN OPTICAL UNIT OF AN OPTICAL MODULE AND COUPLING ELEMENT FOR SUCH AN ARRANGEMENT

(75) Inventors: Hans-Ludwig Althaus, Lappersdorf (DE); Hans Hurt, Regensburg (DE); Stephan Prucker, Burglengenfeld (DE); Tobias Stäber, Regensburg (DE); Frank Weberpals, Regensburg (DE); Josef Wittl, Parsberg (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/257,860

(22) Filed: Oct. 25, 2005

(65) Prior Publication Data

US 2006/0088252 A1    Apr. 27, 2006

(30) Foreign Application Priority Data

Oct. 27, 2004    (EP) .................................. 04090411

(51) Int. Cl.
  *G02B 6/38* (2006.01)
  *G02B 6/36* (2006.01)
(52) U.S. Cl. .............................. 385/67; 385/61; 385/79
(58) Field of Classification Search ................... 385/61, 385/67, 33, 93, 74, 92
See application file for complete search history.

(56) References Cited

U.S. PATENT DOCUMENTS

| | | | | |
|---|---|---|---|---|
| 4,146,300 A | * | 3/1979 | Kaiser | 385/67 |
| 4,534,616 A | * | 8/1985 | Bowen et al. | 385/79 |
| 5,526,455 A | * | 6/1996 | Akita et al. | 385/93 |
| 5,917,985 A | * | 6/1999 | Im | 385/140 |
| 6,287,016 B1 | | 9/2001 | Weigel | |
| 6,470,120 B2 | | 10/2002 | Green et al. | |
| 6,572,280 B2 | * | 6/2003 | Hurt et al. | 385/92 |
| 6,742,936 B1 | * | 6/2004 | Knecht et al. | 385/67 |
| 6,935,791 B2 | * | 8/2005 | Ban et al. | 385/90 |
| 2002/0131728 A1 | | 9/2002 | Kovalchick | |
| 2004/0165840 A1 | * | 8/2004 | Kato et al. | 385/92 |
| 2006/0039655 A1 | * | 2/2006 | Wilson | 385/79 |

FOREIGN PATENT DOCUMENTS

| | | |
|---|---|---|
| DE | 23 58 785 C2 | 6/1975 |
| DE | 100 09 242 A1 | 8/2000 |
| JP | 63228108 * | 9/1988 |
| JP | 01116504 A | 5/1989 |

* cited by examiner

*Primary Examiner*—Charlie Peng

(57) ABSTRACT

Various embodiments of arrangements for optically coupling an optical waveguide to an optical unit of an optical module are provided. One embodiment is an optical module for optically coupling an optical waveguide to an optical unit. One such optical module comprises: a reference structure having a reference geometry that defines a first axis of symmetry; an optical unit having an optical axis along which light is transmitted or received, the optical unit positioned relative to the reference structure with an offset between the first axis of symmetry and the optical axis; and a coupling element that couples the optical unit to an optical waveguide, the coupling element having an eccentric hole which functions as a fiber guide and a structural geometry adapted to compensate for the offset between the first axis of symmetry and the optical axis.

13 Claims, 4 Drawing Sheets

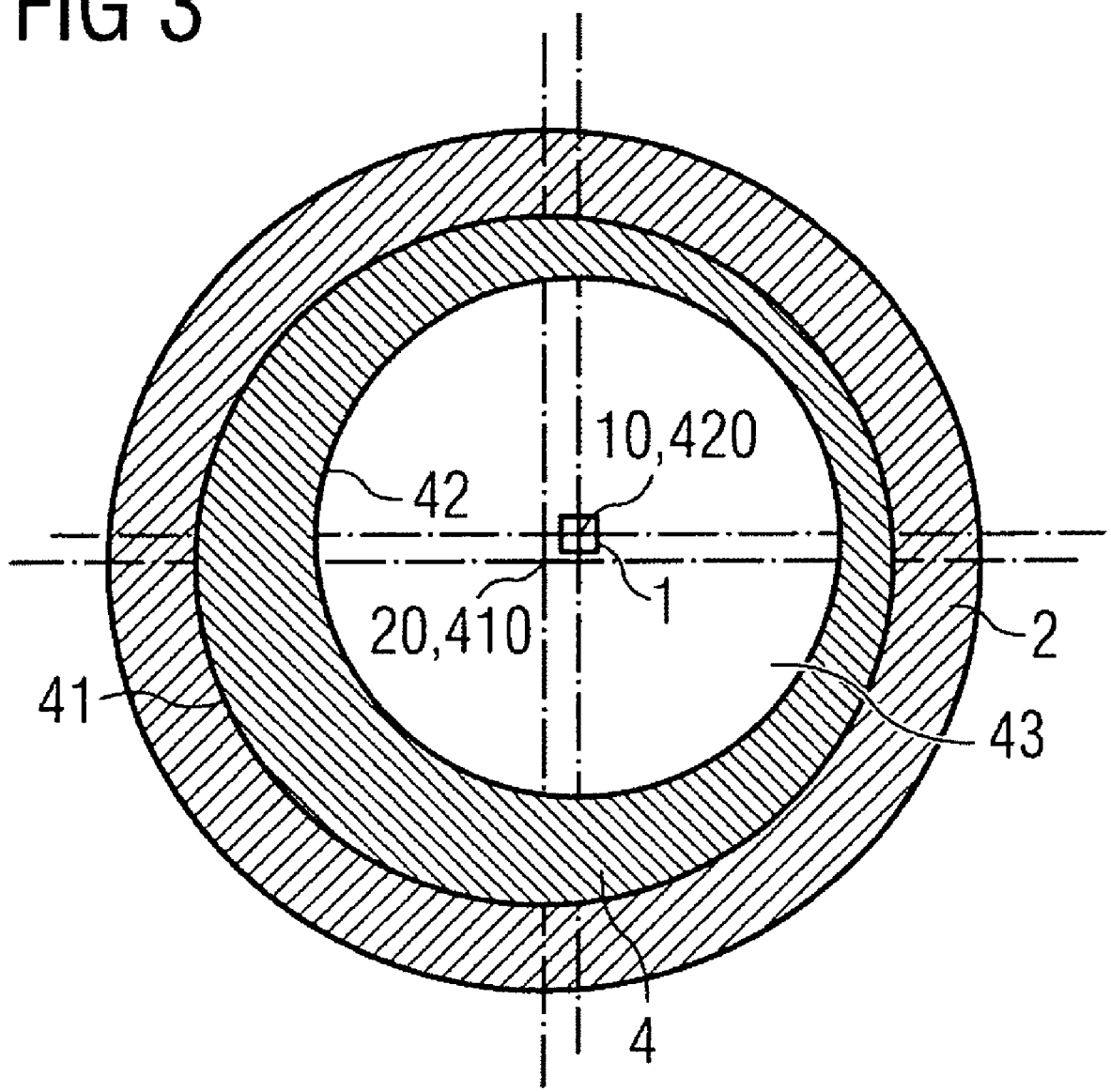

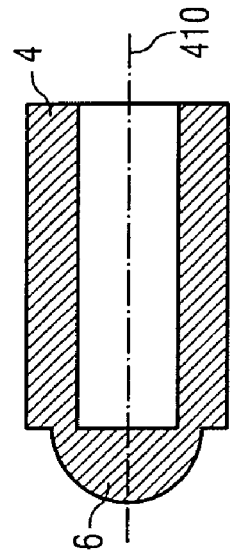 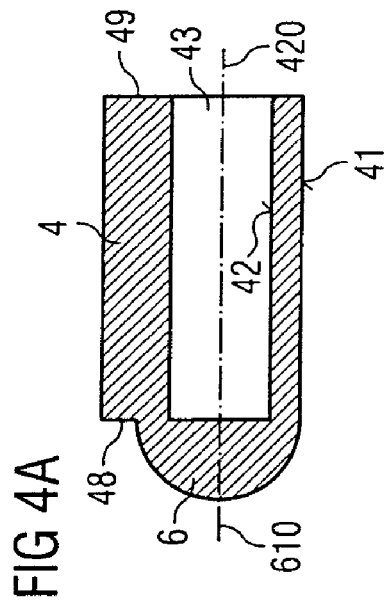
FIG 4A  FIG 4B
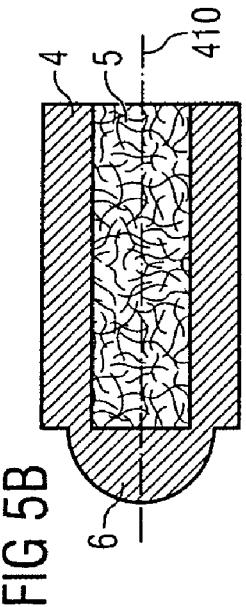 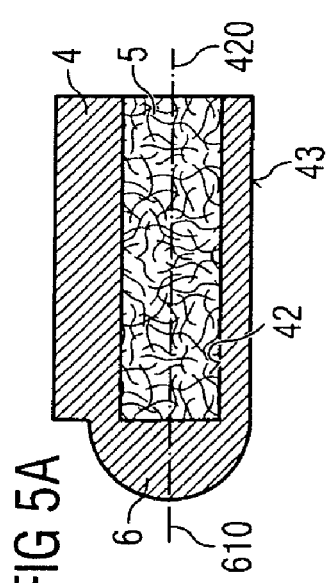
FIG 5A  FIG 5B
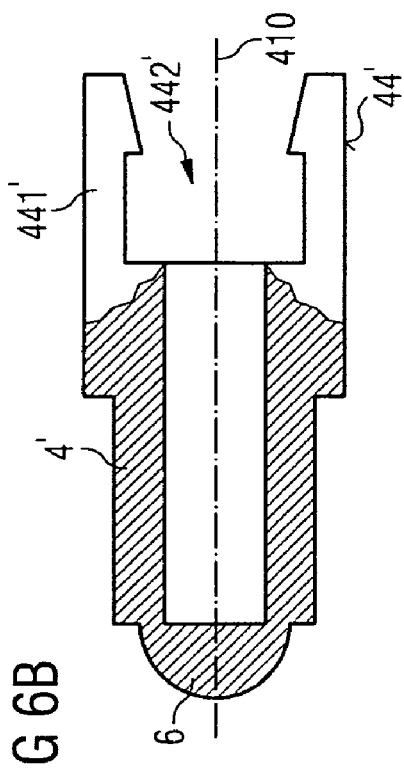 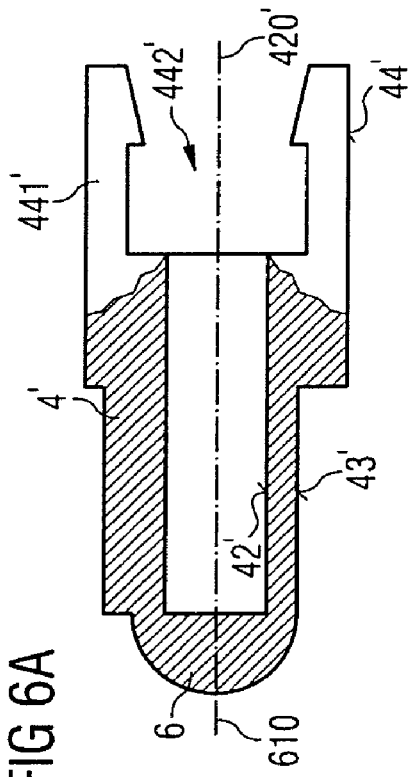
FIG 6A  FIG 6B

ARRANGEMENT FOR OPTICALLY COUPLING AN OPTICAL WAVEGUIDE TO AN OPTICAL UNIT OF AN OPTICAL MODULE AND COUPLING ELEMENT FOR SUCH AN ARRANGEMENT

REFERENCE TO RELATED APPLICATION

This application claims the benefit of the priority date of European patent application 04 090 411.2, filed on Oct. 27, 2004, the contents of which is herein incorporated by reference in its entirety.

FIELD OF THE INVENTION

The invention relates to an arrangement for optically coupling an optical waveguide to an optical unit of an optical module and to a coupling element for such an arrangement.

BACKGROUND OF THE INVENTION

There is generally the problem of coupling an optical unit, such as a vertically emitting laser or a photodiode, to an optical waveguide in an effective manner. For this purpose it is known to carry out active adjustment of the optical waveguide in relation to the optical unit. In this case, the optical waveguide is oriented to a maximum coupled-in or coupled-out power during operation of the optical unit and is fixed in this position. This active adjusting operation is very time-consuming and cost-intensive, however, and is therefore not suitable for a high-volume use.

DE 199 09 242 A1 has disclosed an optoelectronic module, in which a leadframe having an optoelectronic transducer is positioned in a module housing and is cast with a transparent, moldable material. Light is coupled in or out using an optical fiber, which is coupled to a connector of the module housing. The driver module or reception module for the optoelectronic transducer is also located on the leadframe.

US-B2-6 470 120 describes a method and an apparatus, with which both an optical component and an associated optical waveguide are in each case arranged on an inner sleeve, which is formed eccentrically in relation to an outer sleeve, which is fixedly arranged in an outer frame. In this case, the inner sleeve is in each case arranged such that it can rotate in a corresponding hole in the outer sleeve. Furthermore, the optical component and the optical waveguide are in each case arranged eccentrically in the inner sleeve. By rotating the outer and/or inner sleeve, in each case the position of the optical component and of the optical waveguide can be adjusted and the latter can be positioned with respect to one another by rotating the respective inner and outer sleeves in a suitable manner.

DE-A-23 58 785 has disclosed an adjustable coupling apparatus for optical components, with which an optical fiber is arranged in an eccentric hole in a plug part, which is arranged in a likewise eccentric hole in a plug eccentric, the plug eccentric being mounted centrally in an eccentric guide. Owing to a superimposition of the rotational movements of the plug part and the plug eccentric, the entry surface of the optical fiber can be aligned with the position of an optical element, which is to be optically coupled to the optical fiber.

It is also generally known to use a coupling lens when optically coupling an optical component to an optical waveguide, said coupling lens being arranged between the optical component and the optical waveguide. When producing optical components having a lens, in this case two or more embodiments are known. In one first embodiment, the coupling lens is formed directly from the material of the housing of the optical component. For example, the lens is formed using a transparent material, which is injection-molded around an optical component in an injection-molding process so as to provide a packaging. In a second embodiment, the coupling lens is produced discretely, on the other hand, and is then attached to an optical component or connected to it in another manner.

In relation to the latter embodiment, it is known from US 2002/0131728 A1 to arrange an optical subsystem having an eccentrically arranged lens on a submount, on which a light-emitting or light-detecting optical unit is already arranged. The light-emitting or light-detecting optical unit and the optical subsystem are in this case fixed to the same submount.

Owing to production tolerances, there is generally disadvantageously in each case an offset between the optical axis of an optical waveguide, into which light is intended to be coupled or from which light is intended to be coupled, of the coupling lens and the component. This reduces the quality of the coupling-in/coupling-out of light into/from the optical waveguide.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention provides an arrangement for optically coupling an optical waveguide to an optical unit of an optical module and a coupling element for such an arrangement, which make possible the alignment of an optical waveguide in relation to an optical unit in a simple and cost-effective manner without the need for an active adjustment and, in the process, at the same time allow for integration of a coupling lens into the beam path between the optical unit and the optical waveguide in an effective manner.

Accordingly, the optical module has a reference geometry which precisely defines a (first) axis of symmetry. Initially, an offset between the optical axis of the optical unit and the axis of symmetry of the reference geometry is determined. Furthermore, a coupling element acting as an adapter is provided, which serves the purpose of accommodating an optical waveguide which is to be aligned in relation to the optical unit, and which has, for this purpose, a hole, which is delimited by an inner surface, the inner surface defining a (second) axis of symmetry. The coupling element is arranged in relation to the optical module such that the second axis of symmetry coincides with the optical axis of the optical unit, the first axis of symmetry and the second axis of symmetry extending parallel to one another and having an offset with respect to one another which is essentially the same as the offset between the optical axis of the optical unit and the first axis of symmetry of the reference geometry.

According to the invention, the coupling element also has a beam-shaping element, which is, in particular, a coupling lens, on the side facing the optical unit. The optical axis of the beam-shaping element in this case coincides with the second axis of symmetry, which is formed by the hole delimited by the inner surface. The coupling element and the lens thus form one unit: the lens is integrated in the coupling element.

The solution according to the invention is based on the concept of determining the offset between the ideal position of an optical unit in relation to the optical module and the actual position, and, for the purpose of compensating for this offset, using a coupling element which compensates for this offset. At the same time, a beam-shaping element is integrated into the coupling element, in which case the optical axis of the beam-shaping element and the axis of symmetry of the hole in the coupling element—and thus also the optical axis of the beam-shaping element and the optical axis of an optical fiber introduced into the hole in the coupling element—coincide.

Since the coupling element and the beam-shaping element form one unit, the offset between the hole in the coupling element (which represents the guide for an optical fiber) and the beam-shaping element can be minimized. Since the offset remains the same even when the coupling element is rotated, the remaining offset can also be considered more easily. It is also possible to match the lens geometry and the distance of the lens apex from the surface of the optical unit to the respective boundary conditions, such as fiber diameter and type of optical unit, when using a coupling lens.

The beam-shaping element may be designed to be integral with the coupling element. For example, the coupling element is produced with the integrated beam-shaping element from a transparent material, for example in the form of an injection-molded part. Alternatively, provision may be made for the beam-shaping element to represent a separate, discrete part, which is connected to the coupling element.

The coupling element, in one example, has an outer surface having a further axis of symmetry, which coincides with the axis of symmetry of the reference geometry. In other words, the cutout is thus formed eccentrically in the coupling element, the degree of eccentricity being precisely selected such that the offset between the optical axis of the optical unit and the axis of symmetry of the reference geometry is compensated for.

In one refinement of the invention, the coupling element is an elongate sleeve having an eccentric hole. The sleeve has two axes of symmetry. One axis of symmetry is defined by the axis of symmetry of the outer contour or outer surface of the sleeve, and the other axis of symmetry is defined by the axis of symmetry of the inner contour or inner surface. Once the offset between the optical axis of the optical unit and the axis of symmetry of the reference geometry has been established, a sleeve having one design is fixed to the optical module, in which case the distance between the two axes of symmetry of the sleeve precisely corresponds to the offset between the optical axis of the optical unit and the axis of symmetry of the reference geometry.

The eccentric hole in the sleeve, in one example, extends from one side of the sleeve up to the beam-shaping element. In the process, this beam-shaping element is, in one example, not arranged in the hole itself but is formed or arranged on the end side of the sleeve facing the optical unit.

In order to establish an offset between the optical axis of the optical element and the mechanical axis of the reference geometry, image recognition methods are used, for example. For this purpose, for example, the reference geometry and the current position of the optical unit are sensed by means of a camera, and the offset of the optical unit with respect to the reference geometry is determined by means of a pattern recognition program.

The reference geometry—which is formed by the structure of the module—is, in one example, used not only as a reference for the arrangement of the optical unit, but also for the purpose of mechanically coupling and fixing the coupling element to the optical unit. In this case, it forms guide structures. Such a fixing is possible in a simple manner since the axis of symmetry of the reference geometry and the axis of symmetry, which is defined by the outer contour of the coupling element, of the coupling element are, in one example, identical after fixing. The axis of symmetry of the hole in the coupling element, on the other hand, is offset in relation thereto and corresponds to the optical axis of the optical unit.

Other modules, arrangements, methods and systems are disclosed.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail below using a plurality of exemplary embodiments with reference to the figures of the drawing, in which:

FIG. 3 shows the arrangement of an optical unit in an optical module having a reference geometry, in addition a sleeve having an eccentrically formed hole being provided for the purpose of coupling an optical waveguide.

FIG. 4a shows a first exemplary embodiment of a sleeve having an eccentric hole.

FIG. 4b shows, for comparison purposes, a sleeve as shown in FIG. 4a with a non-eccentric hole.

FIG. 5a shows a second exemplary embodiment of a sleeve having an eccentric hole.

FIG. 5b shows, for comparison purposes, a sleeve as shown in FIG. 5a having a non-eccentric hole.

FIG. 6a shows a third exemplary embodiment of a sleeve having an eccentric hole.

FIG. 6b shows, for comparison purposes, a sleeve as shown in FIG. 6a having a non-eccentric hole.

DETAILED DESCRIPTION OF THE INVENTION

Figure 1:
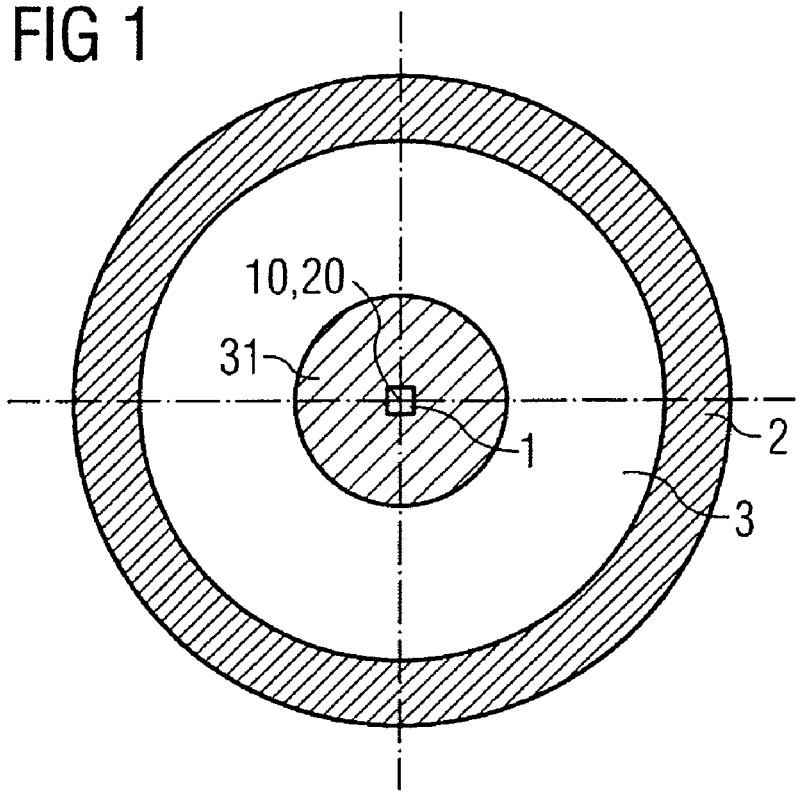
FIG. 1 shows a schematic of the arrangement of an optical unit in an optical module, which has a reference geometry.

The present invention will now be described with reference to the attached drawings, wherein like reference numerals are used to refer to like elements throughout. It will be appreciated by those skilled in the art that the invention is not limited to the exemplary implementations and aspects illustrated and described hereinafter.

First of all, the basic concept of the present invention will be explained with reference to FIGS. 1 to 3. FIG. 1 shows a plan view of an optical unit 1, which is arranged on a reference surface 3 of an optical module (not illustrated in any more detail). The optical module is, in particular, an optoelectronic transmission module and/or an optoelectronic reception module, for example an optoelectronic transceiver. The reference surface 3 is, for example, the surface of a carrier substrate, on which the optical unit 1 is mechanically fixed and on which electrical contact is made with said optical unit 1, in a manner known per se.

The optical unit 1 may in principle have any desired design. It is, in one example, a light-emitting diode (LED), a vertically emitting laser diode (VCSEL), an edge emitter, a photodiode, a mirror or another optical functional surface, via which light is received or transmitted. The optical unit is, in one example, in the form of a prefabricated chip, which is placed on the reference surface 3. It is therefore also referred to below as an optical chip 1. The term "optical chip" thus also represents any desired light-emitting or light-receiving optical element.

The optical unit 1 has an optical axis 10, which lies at the point of intersection of the system of coordinates illustrated by broken lines in FIG. 1. Light is transmitted or light is received by the optical chip 1 along the optical axis 10. The optical axis 10 extends perpendicularly to the plane of the drawing in FIG. 1.

The reference structure 2 is formed on the optical unit and, as will be explained below, is used, inter alia, for coupling structures, which serve the purpose of fixing an optical waveguide to the optical module and make possible precise adjustment of such an optical waveguide in relation to the optical chip 1.

The reference geometry 2 has a symmetrical shape. In the exemplary embodiment illustrated, the reference geometry 2 is cylindrical, with the result that it is circular in the sectional illustration and in the front view. However, reference will be made at this juncture to the fact that other geometric shapes are also possible, for example an N-sided shape. The reference geometry also does not need to have a continuous geometrical structure. It may likewise comprise individual points or regions, for example comprise three or four points, which are not connected to one another. However, it is important that the reference geometry have an inner symmetry, which defines a first axis of symmetry 20.

In FIG. 1, the axis of symmetry 20 of the reference structure 2 coincides with the optical axis 10 of the optical chip 1 since the optical chip 1 is arranged precisely in the center of the reference geometry. This is the ideal state, but can be achieved only rarely in practice. In general, the optical chip 1 will be arranged within a region 31 of the reference surface 3. This region 31 specifies an offset region, in which the optical axis of the chip 1 does not match the geometric axis of the reference structure 2.

Figure 2:
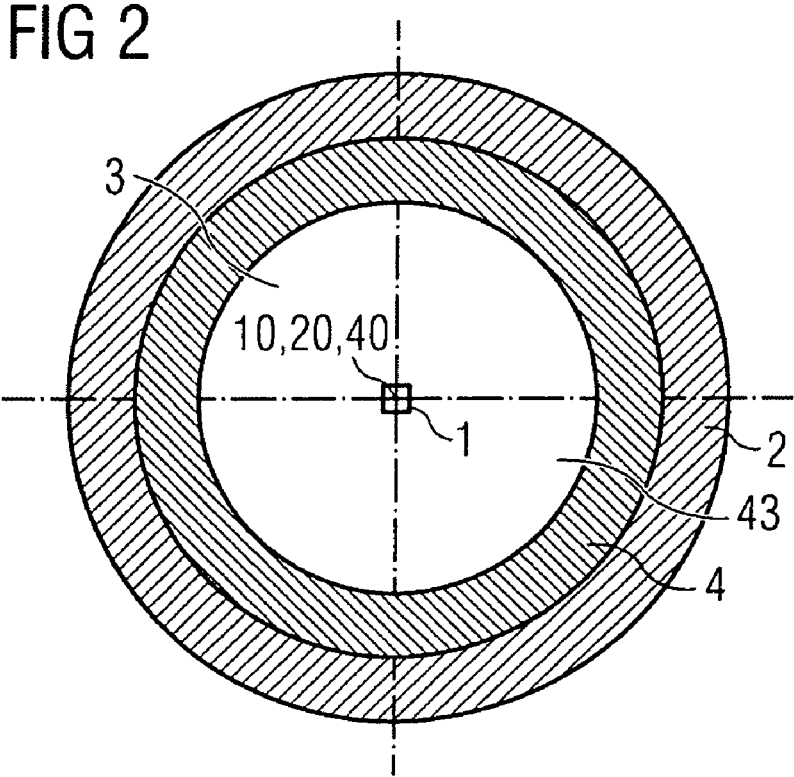
FIG. 2 shows the arrangement of an optical unit in an optical module having a reference geometry, in addition a sleeve having a central hole being provided for the purpose of coupling an optical waveguide.

FIG. 2 shows an arrangement, in which, in addition, an elongate sleeve 4 having an inner hole or cutout 43 is arranged within the reference structure 2 in FIG. 1. The sleeve 4 is of symmetrical design, and the hole 43 is formed centrally in the sleeve 4. The sleeve 4 also has an axis of symmetry 40, which matches, on the one hand, the axis of symmetry 20 of the reference geometry 2 and, on the other hand, the optical axis 10 of the optical chip owing to the symmetrical arrangement of the sleeve 4 in the reference geometry 2.

FIG. 2 also specifies the ideal, but not realistic case in which the optical chip 1 is placed successfully on the reference surface 3 such that the optical chip 1 lies precisely on the axis of symmetry of the reference geometry 2.

Moreover, note will be made of the fact that the reference geometry 2 is formed, for example, by a cylindrical connector, into which the cylindrical sleeve is inserted. The outer diameter of the cylindrical sleeve 4 in this case corresponds precisely to the inner diameter of the cylindrical connector 2, with the result that the sleeve can be inserted into the connector 2 essentially without play. That end of the sleeve 4 which is remote from the optical chip 1 serves the purpose of accommodating and coupling an optical waveguide, with the result that the sleeve provides alignment between the optical chip 1 and an optical waveguide to be coupled.

FIG. 3 now shows the case which is realistic in practice, in which the optical chip 1 is mounted on the reference surface of the optical unit with an offset with respect to the reference geometry 2. This means that the optical axis 10 of the optical chip 1 and the axis of symmetry 20 of the reference geometry 2 no longer coincide, but rather extend parallel to one another with an offset.

In order to compensate for this offset when coupling an optical waveguide, a specially formed coupling structure is now provided. For this purpose, a sleeve 4 is provided, which has an eccentric hole or cutout 43. The wall of the sleeve 4 in this case has an outer contour 41 and an inner contour 42, which form between them a sleeve wall of varying thickness. The inner contour 42 of the sleeve, i.e. the inner wall, which defines the cylindrical hole 43, has a first axis of symmetry 420 of the sleeve 4. The first axis of symmetry in this case extends naturally along the center or axis of the hole 43. On the other hand, the outer contour 41, i.e. the outer wall of the sleeve 4, defines a further axis of symmetry 410. The two axes 420, 410 are offset with respect to one another.

It can be seen that the axis of symmetry 410 of the outer wall of the sleeve 4 lies on the axis of symmetry 20 of the reference geometry 2. This is associated with the fact that the outer wall 41 extends symmetrically with respect to the reference geometry.

The axis of symmetry 420 in relation to the inner wall 42 or the hole 43, on the other hand, is offset from the axis of symmetry 20 of the reference geometry. Provision is now made for a sleeve 4 to be selected, in the case of which the offset between the two axes of symmetry 410, 420 of the sleeve is essentially the same as the offset between the optical axis 10 of the optical chip 1 and the axis of symmetry 20 of the reference geometry 2, to be precise both as regards magnitude and (after corresponding rotation of the sleeve) as regards direction. As a result, the axis of symmetry 420 of the hole 43 matches the optical axis 10 of the optical chip. In this manner, an optical fiber, which is inserted into that end of the sleeve 4 which is remote from the optical chip 1, is automatically adjusted and positioned precisely with respect to the optical chip 1, i.e. the coupled-in or coupled-out power is at a maximum. In the process, this is achieved without there being any need for an active adjustment.

In order to align an optical fiber in relation to an optical unit 1, the following method steps are carried out.

Once the optical chip 1 has been mounted on the reference surface 3 of the optical module, it is initially established what degree of offset the optical chip 1 or the optical axis 10 of the optical chip has in relation to the axis of symmetry 20 of the reference geometry 2 provided on the optical module. It is thus established at which point of the offset region 31 (FIG. 1) the optical chip 1 has actually been placed. Such a determination, in one example, takes place by means of an image recognition method. For example, the reference geometry and the optical chip are sensed by means of a camera, and their position is determined by means of a pattern recognition system. The pattern recognition system determines the offset (deviation of the actual position from the desired position) of the optical chip 1 with respect to the reference geometry 2. The offset is a vector having a specific length and a specific direction.

Once the offset has been determined, a suitable sleeve 4 is now selected from an assembly kit having a plurality of sleeves having an eccentric hole, and this sleeve 4 is used to compensate for the offset.

In this case, a sleeve 4 is selected, in the case of which the distance between the two axes of symmetry 410, 420 explained in relation to FIG. 3 precisely corresponds to the magnitude of the offset vector. The sleeve is fixed to the optical module in relation to the reference geometry 2 and is then rotated into a position in which the direction of the offset also corresponds. The end result is the situation illustrated in FIG. 3.

FIGS. 4A, 5A, and 6A show a plurality of exemplary embodiments for sleeves 4, 4', as can be used in an arrangement shown in FIG. 3. In this case, the sleeves are illustrated in a sectional, side view. The respectively associated FIGS. 4B, 5B and 6B show the corresponding sleeves having a symmetrical hole, i.e. without an eccentric hole 43.

FIG. 4A shows a sleeve 4, in the case of which a hole 43 having an axis of symmetry 420 is formed eccentrically in the sleeve 4. The hole 43 acts as a fiber guide. A coupling lens 6 is formed on that side 48 of the sleeve 4 which faces the optical unit 1. The hole 43 extends from the other side 49 of the sleeve up to the coupling lens 6. In this case, the coupling lens 6 is formed on that side 48 of the sleeve 4 which faces the optical unit 1 such that its optical axis 610 coincides with the axis of symmetry 420 of the hole 43. The lens apex of the coupling lens 61 protrudes with respect to the associated side 48 of the lens and extends in the direction of the optical unit.

In the exemplary embodiment illustrated, the coupling lens 6 is designed to be integral with the sleeve 4. For example, the unit is made from a transparent plastic material.

FIG. 4B shows a sleeve having a symmetrical hole and an axis of symmetry 410, which relates to the outer wall of the sleeve. A coupling lens 6 is likewise illustrated, whose axis likewise lies on the axis of symmetry 410.

The sleeve 4 may in principle be made from plastic, metal or ceramic. In the two last-mentioned cases, the coupling lens 6 is produced as a separate element, however, and arranged on one side 48 of the coupling element. A fiber is inserted into the opening 43 in the sleeve 4 directly from one side, for example, via a plug interface (receptacle). Such couplings are known per se and so will not be explained in any more detail.

In FIG. 5A, the sleeve has a corresponding design to that in FIG. 4a. However, in this case a so-called fiber stub 5 is fixed in the hole 43. An optical waveguide section 5 is thus integrated fixedly in the sleeve 4, acts as a coupling element and is optically coupled, on the one hand, to an optoelectronic transmission and/or reception component (chip 1) via the coupling lens 6 and, on the other hand, to an optical fiber to be coupled. The coupling of an optical fiber to one side of the fiber stub 5 takes place in a manner known per se, for example by means of a surrounding housing, in which the individual components are arranged. FIG. 5B shows a sleeve 4 having a coupling lens 6 and a fiber stub 5, which has a symmetrical hole.

In accordance with the refinement in FIG. 6A, one end of a sleeve 4' forms a latching part 44', which has latching structures 441' and an accommodating opening 422' for the purpose of coupling an optical plug. By inserting an optical plug into the opening 442' and corresponding latching, an optical plug can be connected to an optical fiber by means of a snap connection with the sleeve 4'. FIG. 6B in turn shows a sleeve 4' having a symmetrical cutout.

Reference is made to the fact that the sleeve 4, 4', as illustrated in FIG. 3, is, in one example, fixed to the optical module via the reference geometry 2. For this purpose, the sleeve 4 is fixed to the lens 6 on the reference geometry by means of adhesive bonding, welding or another permanent type of connection. The reference geometry therefore serves the purpose of fixing the sleeve 4. This is advantageously, but not necessarily, the case. For example, the reference geometry can also be used merely for determining an offset of the optical chip 1, and fixing of the sleeve 4 to the coupling lens 6 on the optical module may also take place using other fixing structures.

Figure 7:
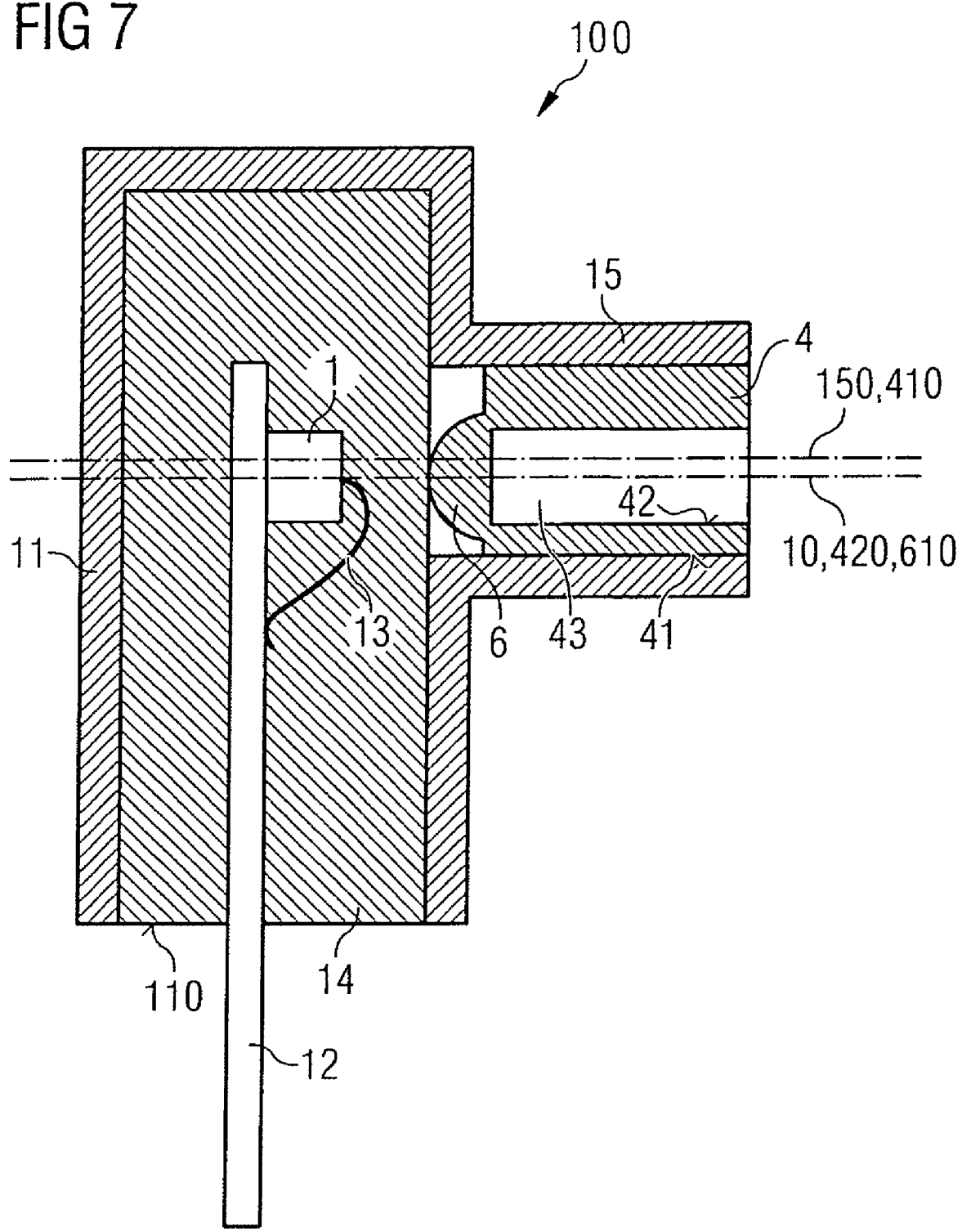
FIG. 7 shows an optoelectronic module having a transmission or reception component arranged on a leadframe.

FIG. 7 shows an optical module 100 having a housing 11, which is filled with a transparent casting material 14 and into which a leadframe 12 is inserted through a lower housing opening 110. An optical chip 1, with which electrical contact is made by means of a bonding wire 13 and another contact (not illustrated), is located on the leadframe 12. The housing 11 also forms a connector 15 as the reference geometry, said connector serving the purpose of coupling an optical fiber. The connector has an axis of symmetry 150. The optical chip 1 has an optical axis 10, which would ideally match the axis of symmetry 150 of the connector. In reality and in the exemplary embodiment illustrated, however, this is not the case, with the result that the axes 10, 150 are offset with respect to one another.

A sleeve 4 having an integrated coupling lens 6 as shown in FIG. 4a is now inserted into the connector 15, the sleeve 4 having an eccentric hole 43. The axis of symmetry 420 of the hole 43 in this case lies on the optical axis 10 of the optical chip 1 and coincides with the optical axis of the coupling lens 6. The axis of symmetry 410 of the outer wall 41 of the sleeve 4, on the other hand, lies on the axis of symmetry 150 of the coupling connector 15. This makes it possible for the sleeve 4 to be inserted into the coupling connector 15 without any problems. Since the axis of symmetry 420 of the hole 43 matches the optical axis 10 of the optical chip, an optical fiber can be fixed in an ideal coupling position on the sleeve 4 and the coupling connector 15. Owing to the coupling lens 6, in this case effective light coupling is made possible with minimum offset.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising." Additionally, the term "exemplary" as utilized herein simply means example, rather than the best.

What is claimed is:

1. An optical module for optically coupling an optical waveguide to an optical unit, the optical module comprising:
a reference structure having a reference geometry that defines a first axis of symmetry;
an optical unit having an optical axis along which light is transmitted or received, the optical unit fixed relative to the reference structure with a production offset between the first axis of symmetry and the optical axis; and a coupling element assembly kit comprising a plurality of coupling elements from which one is selected for coupling the optical unit to an optical waveguide and for compensating for the production offset, each coupling element having an eccentric hole which functions as a fiber guide and a unique structural geometry defined by an inner surface having a second axis of symmetry and an outer surface having a third axis of symmetry and on which a beam-shaping element is integrally formed on an end of the coupling element facing the optical unit, the second axis and the third axis defining a unique second offset for the corresponding coupling element, wherein one of the unique second offsets is substantially the same as the offset between the first axis and the optical axis, and wherein the coupling element is positioned relative to the optical unit and the reference structure with the second axis coinciding with the optical axis and the third axis coinciding with the first axis to compensate for the offset between the first axis of symmetry and the optical axis.

2. The optical module of claim 1, wherein the coupling element comprises a sleeve that defines the eccentric hole.

3. The optical module of claim 2, wherein the outer surface is symmetrical to the reference geometry of the reference structure.

4. The optical module of claim 1, wherein the coupling element further comprises a beam-shaping element positioned on a side of the coupling element facing the optical unit.

5. The optical module of claim 4, wherein the beam-shaping element is integral with the coupling element.

6. The optical module of claim 4, wherein the beam-shaping element comprises a lens.

7. The optical module of claim 1, wherein the coupling element further comprises a latching structure on a side remote from the optical unit for coupling an optical plug to the optical waveguide.

8. The optical module of claim 1, wherein the reference geometry is cylindrical.

9. An arrangement for optically coupling, comprising:
an optical chip located on an optical axis;
a cylindrical connector fixed relative to the optical chip and having a hole and a reference geometry that defines a first axis of symmetry, wherein the first axis of symmetry is offset from the optical axis by a first offset; and
an assembly kit comprising a plurality of cylindrical sleeves from which one is selected to be positioned in the hole of the cylindrical connector for coupling the optical unit to an optical waveguide, each cylindrical sleeve having a beam-shaping element integrally formed on an end facing the optical chip and defining a unique second offset for compensating for the first offset and having an eccentric hole defined by an inner surface having a second axis of symmetry and an outer surface having a third axis of symmetry, the second and third axis defining the unique second offset, wherein one of the unique second offsets matches the first offset, and wherein the cylindrical sleeve and the cylindrical connector are positioned relative to each other with the second axis coinciding with the optical axis and the third axis coinciding with the first axis such that the second offset compensates for the first offset.

10. The arrangement of claim 9, further comprising an optical fiber positioned in the cylindrical sleeve.

11. The arrangement of claim 9, wherein the cylindrical sleeve further comprises a beam-shaping element positioned on a side of the cylindrical sleeve facing the optical unit.

12. The arrangement of claim 9, wherein the outer surface is symmetrical to the reference geometry of the cylindrical connector.

13. An optical module for optically coupling an optical waveguide to an optical unit, the optical module comprising:
a reference structure having a reference geometry that defines a first axis of symmetry;
an optical unit having an optical axis along which light is transmitted or received, the optical unit fixed relative to the reference structure with a production offset between the first axis of symmetry and the optical axis; and
a coupling element having an eccentric hole which functions as a fiber guide and a unique structural geometry defined by an inner surface having a second axis of symmetry and an outer surface having a third axis of symmetry and on which a beam-shaping element is integrally formed on an end of the coupling element facing the optical unit, the second axis and the third axis defining a unique second offset for the corresponding coupling element, wherein one of the unique second offsets is substantially the same as the offset between the first axis and the optical axis, and wherein the coupling element is positioned relative to the optical unit and the reference structure with the second axis coinciding with the optical axis and the third axis coinciding with the first axis to compensate for the offset between the first axis of symmetry and the optical axis.

\* \* \* \* \*